United States Patent [19]

Stohlquist et al.

[11] 4,045,275

[45] Aug. 30, 1977

[54] MACHINE FOR APPLYING TAPES TO MOVING PRODUCT

[76] Inventors: Roger H. Stohlquist, 2002 Homewood Drive, Rockford, Ill. 61107; John B. Bartell, 1227 N. Race Ave., Arlington Heights, Ill. 60004

[21] Appl. No.: 610,461

[22] Filed: Sept. 4, 1975

[51] Int. Cl.[2] .......... B32B 31/00

[52] U.S. Cl. .......... 156/521; 93/1 TS; 156/DIG. 33

[58] Field of Search .......... 226/95; 156/521, 522, 156/446, DIG. 33, 519, 516, 517; 93/1 TS

[56] References Cited

U.S. PATENT DOCUMENTS

| | | | |
|---|---|---|---|
| 2,483,458 | 10/1949 | Fisher et al. | 156/521 |
| 2,990,081 | 9/1957 | DeNeui | 156/521 X |
| 3,020,193 | 2/1962 | Seck | 156/517 |
| 3,311,032 | 3/1967 | Lucas | 93/1 TS |
| 3,445,314 | 5/1969 | Crim | 156/521 |
| 3,654,038 | 4/1972 | Hottendorf | 156/521 |
| 3,899,385 | 8/1975 | Brinkmeier | 226/95 X |

*Primary Examiner*—David A. Simmons
*Attorney, Agent, or Firm*—Darbo, Robertson & Vandenburgh

[57] ABSTRACT

The machine of this invention applies successive lengths of tape, such as tear-tape, to a continuously moving products, such as a web about to be die cut for forming boxes. The application of the tapes is registration-correlated with the product. Self-adhesive tape is drawn from a roll by a capstan roll which provides a controlled feed of the tape to an applicator wheel. The applicator wheel draws the tape around the applicator wheel, holding it by suction. When a predetermined length on the applicator wheel has passed a cut-off point, that length is cut off, and then the wheel presses its adhesive face against the moving web. The applicator wheel has the same peripheral speed as the web, but the capstan roll, though rotating with it, is substantially smaller and has a lower peripheral speed. After severance, the cut length accepts the peripheral speed of the applicator wheel so as to be properly applied to the web, but the tape behind the cut is still retarded by the capstan, so that it backslips on the applicator wheel and a gap forms between the two pieces. The drive of the applicator wheel and capstan is through a phase adjusting device for adjustment of the registration of the tape on the web (usually having printing in registration with the blankcutter). The tape is cut by a knife blade passing entirely through it inwardly so as to avoid any tendency to lift the tape from the applicator wheel, and to clear the web.

7 Claims, 3 Drawing Figures

MACHINE FOR APPLYING TAPES TO MOVING PRODUCT

INTRODUCTION

The invention of which the present disclosure is offered for public dissemination relates to applying successive lenghts of tape, such as tear-tape, to a moving web (or other product, such as a line of spaced items) in registration with the printing on the web. One preferred use of the invention is in making boxes. A typical example of the end product is a fiberboard (cardboard) detergent or soap box having a tear-tape extending adjacent the top along three sides of it so that when pulled, the tear-tape will sever the three sides while leaving the fourth side intact to serve as the hinge for the nearly severed box top.

There has previously been automatic application of tear-tape to boxes of the type indicated, but the length of tape corresponding to the fourth side of the box has been wasted.

The present invention avoids this waste by feeding the tape at reduced speed, determined by the capstan diameter, such that just the right length of tape is fed between successive cuttings of the tape, the severed piece advancing more rapidly so as to be spaced, ultimately, from the succeeding length of tape by the distance corresponding to the fourth side of the box.

Other advantages of the invention will be apparent from the following description and from the drawings.

DESIGNATION OF FIGURES

INTENT CLAUSE

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

GENERAL DESCRIPTION — TAPE MOVEMENT

Figure 2:
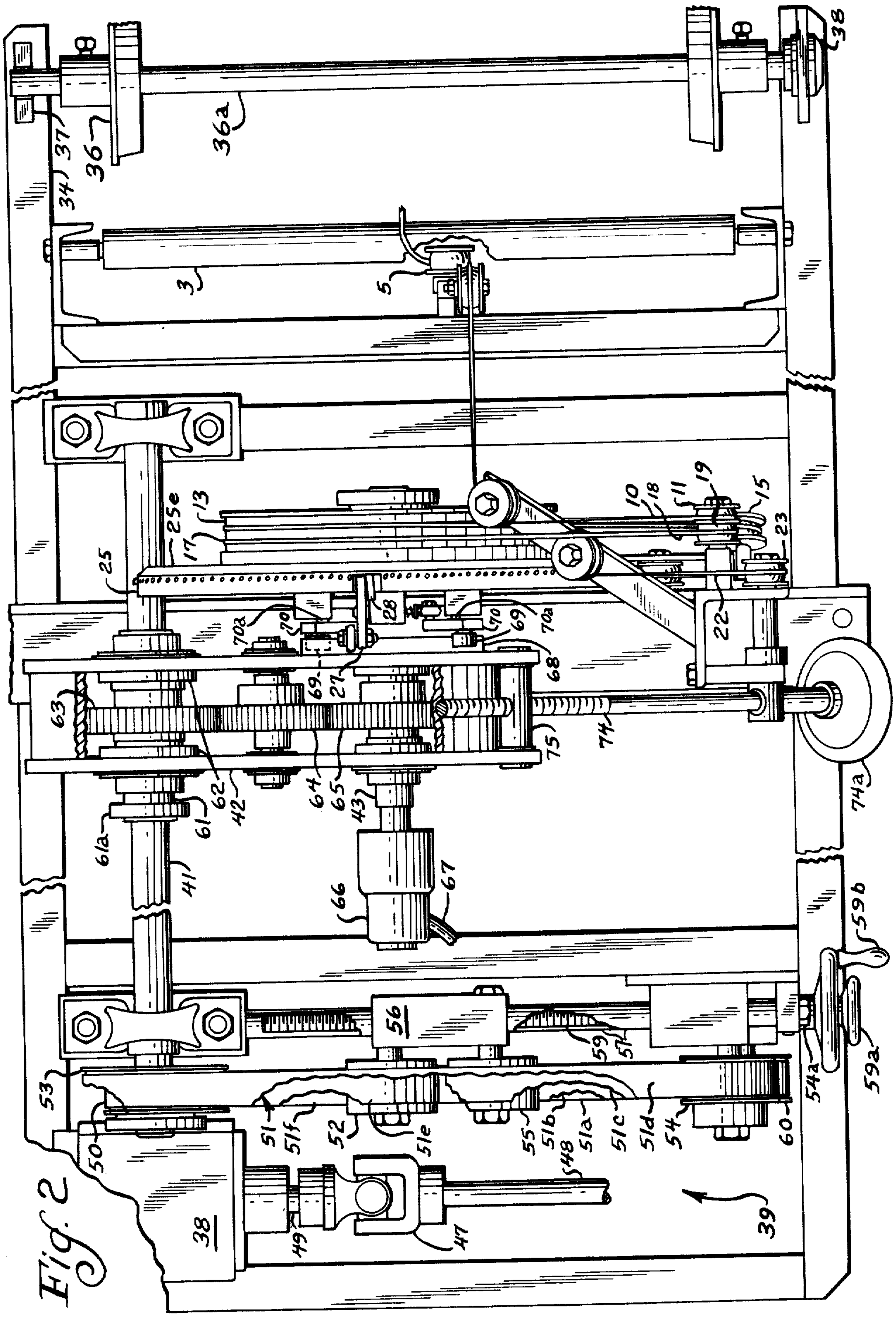
FIGS. 2 and 3 are respectively plan and side views of the tape-applying machine shown in FIG. 1.

The tape roll 1 (FIG. 2) is supplied with the tape wound upon a cardboard tubular core. There are many wraps per layer, helically wound, and many layers in the tape roll 1. The tape leaves the roll 1 in an upward direction 2 (FIG. 2). It is without twist or makes a half twist, as it travels to roller 3, depending on whether the sticky side is to be away from or toward the roller 3. Roller 3 is as long as the tape roll so that it may accommodate the tape from whatever place it comes from along the length of the tape roll 1. The tape makes a 180° wrap over roller 3 and twists 90° as it passes at 4 down to roller 5 and 180° around it. Roller 5 is mounted upon a slider which is free to move up guide bar 5*a* in response to the tugging of the tape, and down when its weight overcomes the pull. This "dancer" roller arrangement helps to smooth out irregularities in the tension of the tape and in getting the heavy tape roller to start turning.

Next, the tape twists 90° as it passes up at 6 to roller 7. The tape then follows around roller 7 for 90° and twists 105° as it moves horizontally at 8 to guide roller 9. Guide roller 9 turns the tape 90° into the plane of the first track of capstan 13. The tape again twists 90° as it moves (as seen best at 10 in FIG. 1) to roller 11 which directs the tape diagonally downward at 12 to the first wrap of the capstan 13. the capstan 13 has a diameter selected so that its circumference is about the same as twice the length of the tape to be applied. (In some cases it might be some other multiple of the desired tape length. If the multiple were three, there would be three shears upon the applicator wheel instead of the two to be described below).

The tape then leaves the first track of the capstan and travels at 14 to roller 15 which is canted somewhat, as seen in FIG. 2, to cause the tape to move (at 16) back to the second wrap 17 of the capstan. Only two wraps of the capstan are shown, but it should be understood that more wraps could be used by reducing the angle of inclination of roller 15 and making more wraps of the capstan and roller 15 (limited, of course, by the width of the capstan and the roller). The more wraps, the greater will be the force developed to pull the tape. After the final wrap of the capstan the tape travels at 18 to roller 19. During the transfers from roller 11 to the capstan, to roller 15 and back to the capstan, and to roller 19, the tape is not twisted. The tape passes about 180° around roller 19 and travels at 20 and twists 90° to roller 21. Roller 21 turns the tape 180° and moves it into the plane of the desired ultimate track on applicator wheel 25. The tape 22 now twists 90° as it travels to the roller 23. On leaving roller 23, the tape 24 moves to roller 23*a* and then tangentially to the applicator wheel 25. The tape is guided onto the applicator wheel with the sticky side away from the wheel and onto a row of holes 25*a* around the periphery of the wheel. Vacuum (suction via passages 25*b*) holds the tape onto the wheel and causes a small tractive pull to be developed on the tape. The tape, however, cannot move at the same surface speed as the periphery of the applicator wheel since its forward movement is controlled by the capstan, which is smaller in diameter than the applicator wheel. Since it has enough friction with the tape to pull the tape from roll 1, it controls the tape speed and therefore while the tape is intact the end of the tape on the applicator wheel must backslip on the applicator wheel.

Figure 1:
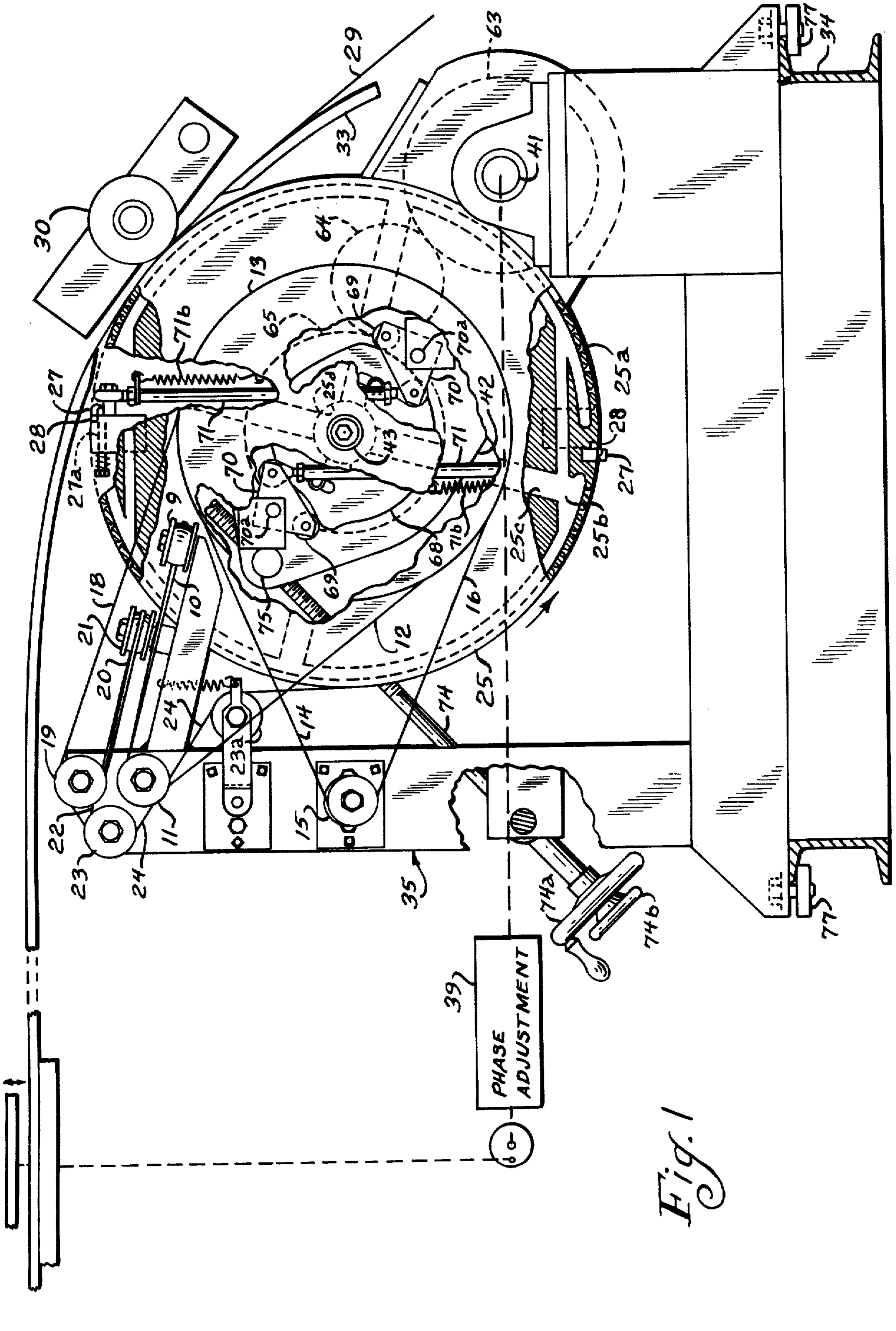
FIG. 1 is in the nature of an end view of the machine, with a diagrammatic representation of its correlation with a die-cutter, showing a face view of the capstan and applicator wheels.

When the proper length of tape is payed onto the wheel, shear blade 27, which is then at the bottom side of the applicator wheel, scissors past blade 28, shearing off the end piece of the tape. The severed piece is still held to the wheel by the vacuum, but now it is free so that it instantly accelerates to the surface speed of the periphery of the applicator wheel. The diameter of the applicator wheel 25 is selected so that the circumference is twice the length of the box blank in the printed web, and its drive is correlated with the web-feeding equipment to have the same peripheral speed as the speed of the web. Therefore the tape is brought to a surface speed matching the web speed, and timed by phasing adjustment 39 (as will be described) to be applied to exactly the desired position on the web 29. FIG. 1 diagrammatically illustrates the timing correlated to the drive of the die-cutting platen to place the tapes in register with the box panels.

At the tangency point of the web 29, which is guided by a wide shoe 33, the tape is transferred to the web by the adhesion of the pressure-sensitive glue on the tape. A gap or window in the web guiding shoe 33 allows the applicator wheel to meet the web, and permits any lateral projections of the shearing means to pass. At and near this tangency point, the shear blade and its associated parts must lie completely below the web surface so that there will be no interference between the blade and the shoe 33 or web 29. The cam 68, to be described below, is designed to accomplish this.

The increased speed of the severed length of tape produces a gap between it and the following length of tape of just the right length to avoid wasting any tape.

Applicator wheel 25 consists of a main disc to which 25 is applied and a cover disc 25*e*, bolted together to form a sandwhich. A pair of semicircular grooves 25*b* are machined in the face of the main disc 25. Connecting radial grooves 25*c* connect the semicircular grooves to a center manifold area 25*d* and thereby connect to a passage in shaft 43. Cover disc 25*e* completes the enclosure of the passageways connecting vacuum to the many holes 25*a* drilled through the rim of the main disc to the semicircular grooves. Preferably, each bore 25*a* opens into a shallow peripheral pocket for adequate holding power when closed by the tape but minimal air flow when open.

SHEAR STRUCTURE

Figure 3:
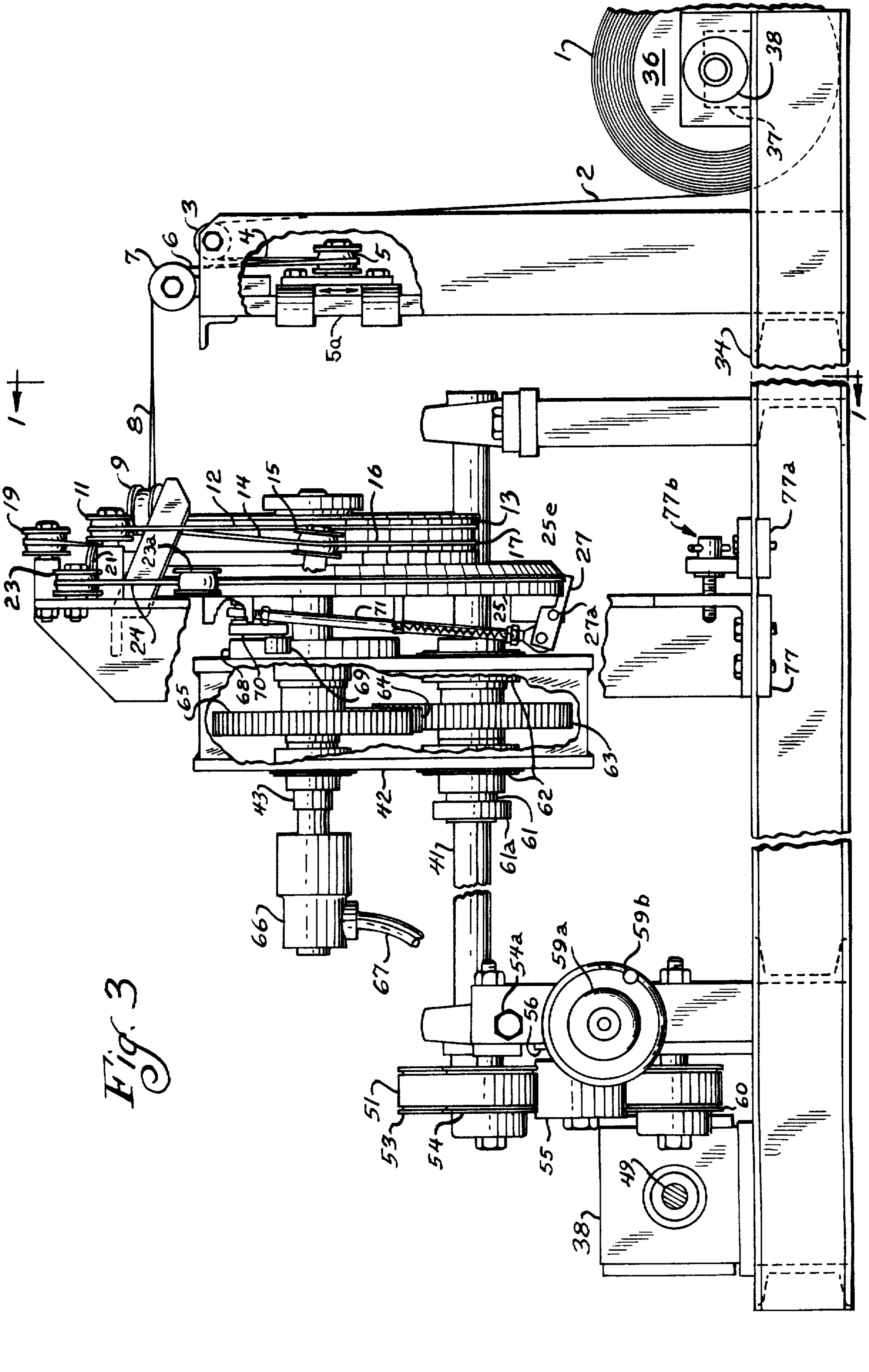

Shear blades 27 are attached to shafts 27*a* (FIG. 3) which are journaled in bearings attached to wheel 25. The shear is set relative to the stationary edge 28 so that the contact is at only one point where the shearing is occuring, and so that the forces of contact will not diminsh as the contact progresses away from the pivot. To allow for movement in the axial direction, the pivot shaft is free to move axially, but is spring-biased toward contact. Stationary shear member 28 has its trailing face angled at 5° from the plane of motion of the shear 27 to prevent any part of the stationary shear piece except the edge from contacting the shear.

TAPE ROLL MOUNTING

Tapered arbor plugs 36 are inserted in each end of the tape roll core, and the plugs are slipped onto the arbor rod 36*a* and locked to it by means of setscrews in the hub of each arbor plub. At one end of the arbor is a friction slip brake 38. The other end of the arbor is supported in open top journal block 37 which is fastened to the frame 34. The freedom of rotation is adjusted by means of an adjustment of the pressure of the friction surfaces in brake 38.

DRIVE TRAIN

To ensure uniform regitration of the tape, power for mechanically driving the machine is taken from one of the registration-correlated components of the box printing and die cutting line. As illustrated diagrammatically in FIG. 1, the power is taken from a drive shaft of the die cutting machine since its drive shaft is maintained in synchronism or registration-correlation with the progress of the web 29. A phase-adjustment unit 39 changes the angular relationship between the cutter drive shaft and drive shaft 41 for applicator wheel 25 to select the desired registration of the tape on the web. A timing belt, not shown, transmits the power from the box cutter drive shaft (FIG. 1) through such gear box and shafts as needed to the input shaft 49 of an input right angle gear box 38. Spaced universal joints 47 (only one shown) on drive shaft 48 permit optimum positioning of the tape applicator machine, and shifting the entire tape-applying machine for lateral adjustment, if desired. On the output shaft of the right angle gear box 38 is mounted a lower timing belt sheave 50 of phasing device 39 which drives upper timing sheave 53. As known for such phasing devices, the path of timing belt 51 is from the bottom of sheave 50 to the bottom of lower pulley 60 (reach 51*a*), around it to the bottom of slide pulley 55 (reach 51*b*), around it to the bottom of upper pulley 54 (reach 51*c*), around it to the top of sheave 53 (reach 51*d*), around it to the top of slide pulley 52 (reach 51*e*), and (as reach 51*f*) around it back to and down around pulley 50.

Phasing slide pulleys 52 and 55 are mounted upon slider block 56 which slides on a pair of parallel guide bars 57. Screw 59 engages the slider block 56 and controls its position. To adjust timing, the lock knob 59*a* is loosened, allowing handle 59*b* to be used to turn the adjusting screw 59, and in turn move the slider block 56 and the idler pulleys mounted on it. If the block 56 moves in one direction, the belt loop around idler 55 is shortened; while belt loop around idler 52 becomes correspondingly longer. In this process the angular relationship of the input sheave must change with respect to the output shaft, as the excess belt moves from the front runs to the rear. When the correct phasing is found, the locking knob 59*a* is tightened. Belt tension is adjusted by means of screw 54*a*.

Shaft 41 is mounted in ball bearing pillow blocks and is driven by phase-adjusted timing belt sheave 53. A sleeve 61 is fitted to be movable along the shaft 41, although keyed to it, and it may be clamped to the shaft by tightening a locking collar 61*a*. The end of the sleeve is slotted so that when the locking collar is tightened, the end of the collar contracts to grip the shaft. Mounted upon sleeve 61 are bearings 62 for pivotally supporting a gear box 42, and between the bearings a gear 63. The gear 63 meshes with an idler gear 64, bearinged in ball bearings carried by gear box 42. Idler gear 64 meshes in turn with gear 65 which is mounted upon and keyed to hollow shaft 43 on which applicator wheel 25 and capstan 13 are keyed. The hollow shaft is journaled in ball bearings carried by gear box 42. The ratios of the various components in the drive train are selected to drive the applicator wheel 25 in a counterclockwise direction (as viewed in FIG. 1), and at a speed which produces one-half revolution for each print interval on the web. Vacuum is coupled to the applicator wheel through a flexible hose 67, rotary union 66, through the hollow shaft 43, through the cross holes therein and into the vacuum passages 25*a*, etc., previously described.

SHEAR DRIVE

Cam 68 is mounted on the side of gear box 42 with its center concentric with shaft 43. The cam does not rotate, but it is adjustably mounted by means of curved slotted bolt holes to permit phasing adjustment. For each cutter a bell crank 70, mounted on a journal in wheel 25, rotates about the cam 68. Cam followers 69 carried on the bell cranks engage the cam and constrain the bell cranks to oscillate on their pivots 70*a*. Connecting rods 71 serve to couple the motion of the bell cranks to the shear blades 27. Tension springs 71*b*, attached to the connecting rods and anchored on the wheel 25, urge the bell cranks and the cam followers mounted upon them to press against the cam 68.

After the shear clears the web 29 and the web guiding shoe 33, the shear blade 27 is opened by spring 71 under control of cam 68. When the shear reaches the area where the tape is approaching the applicator wheel, the shear is fully open. In this position the end of the shear blade 27 has swung back far enough to clear the tape as it passes the reach of the tape approaching the wheel 25. The shear remains in this position until it reaches the area of the bottom of the wheel. At that time, the cam 68 causes the shear to close rapidly. The movement at the time of shearing is quick to reduce problems which might occur due to the difference of velocity of the shear in the direction of rotation and the velocity of the tape as controlled by the capstan. Considerable overshoot of blade 27 is allowed to permit as gentle deceleration as possible. The shear blade 27 is then brought back to a position parallel to the axis of the wheel and the web. For very high speed operation, spring 71 may be replaced by positive cam-drive of the shear 27 in both directions.

ADJUSTMENTS AND SIZE CHANGES

The tape strip must be in registry with printed matter (or ultimate box faces) on the web. Longitudinal registration is accomplished by adjusting the drive phasing mechanism 39 as previously described. Correct lateral positioning of the tape on the web can be accomplished by two methods. Coarse positioning is done by loosening the two clamps 77 and clamp collar 61*a;* also clamp 77*a* if the illustrated shiftable screw adjustment device 77*b* is provided. The whole applicator and tape guidance system may then be moved laterally of the web to a new position.

Screw means are desired for fine adjustments. The screw could act on the same system as illustrated (after tightening clamp 77*a*) or on the entire tape machine. Thus, it is easy to mount the whole main frame 34 on guide blocks fastened to the floor, and to provide screw means for moving the whole machine on the guide blocks.

The entire tape drive and applicator wheel assembly is, as previously described, swingably mounted upon shaft 41. Screw 74, threaded in nut bar 75 which pivots in the end of the applicator wheel drive box 42, determines the position of the drive box and applicator wheel about the shaft 41. Handwheel 74*a*, journaled in a frame member, turns screw 74 after locking knob 74*b* has been loosened. This adjustment can be used to adjust the pressure of applicator wheel 25 on the web, the web being backed by a pressure roller.

Other changes will rarely if ever be necessary. However, the length of the tape can be changed by changing the diameter of the capstan. A whole new capstan is substituted. The equipment can be adapted to a package web length different than the one at hand by changing the diameter of the applicator wheel. A whole new wheel is substituted. The axis of the wheel is adjusted to compensate for wheel diameter changes by means of screw 74 and handwheel 74*a* as previously described.

To adjust the spacing of the turns of tape on the capstan, the angle and positioning of the bracket supporting roller 15 can be adjusted. The mounting bolts and spaced jackscrews in the base of this bracket permit this adjustment. Final feed roll 23*a* is similarly adjustable, at least axially, for feeding the tape accurately centered over the suction passages 25*a*.

ACHIEVEMENT

From the foregoing it is seen that tape such as tear-tape can be applied in separate spaced-apart lengths to a moving web or other product with accuracy as to registration and with no wastage of the tape. The scissors-shearing of the tape, as distinguished from pressure cutting, avoids troublesome "gumming up" and permits the use of lower-cost tapes than have sometimes been required.

MODIFICATIONS AND DETAILS

Although attempting to suggest all possible modifications and details would be too lengthy, those now contemplated as probably preferred are here mentioned.

The capstan is preferably release-coated, and the tape fed to it with its sticky side against the capstan. One loop around the capstan is then enough and fewer guide rollers are needed. A suitable coating is "Teflon" (tetrafluoroethylene resin).

The guide rollers are preferably crowned, to keep the tape centered without contacting the side flanges. A line-contact crown is preferred, as with two conical surfaces tapering off at 2° from the center line. This minimizes the picking up of adhesive particles from the tape edges. However, some very slippery tapes may slide off of the crown. Therefore it may be preferred to use release-coated guide rollers and feed the sticky side of the tape against them. The last roller feeding to the applicator wheel could be an exception, but in FIG. 1 engages the sticky face so that it should be release coated.

The phasing adjustment means should ideally be capable of a range of adjustment covering the full length of the longest box blank to be made using this machine. However, less range may be used by making a rough phasing adjustment before final application of a timing-belt. The timing-belts, of course, have lugs engaging notches in sprockets, to maintain an unvarying correlation. Some users may prefer a differential type of phasing adjustment because it has unlimited range. The illustrated form has an advantage that calibration indications can easily be provided adjacent slide 56 to aid in setting the registration initially.

As illustrated in FIG. 1, the final guide roll is preferably mounted to be a lightweight dancing roll, yielding slightly when the shear blade briefly holds the entire tape to the applicator wheel. Its spring may be a self-contained spring, as a hair-spring, to be unaffected by the adjustment.

The invention may be used for applying its spaced tapes to separate product pieces moved, for example, by a registering conveyor such as flight chains, each cross-flight moving one of the products.

It has been found that the capstan should be slightly larger than the size indicated by calculations, apparently to compensate for a slippage or stretch factor.

The tape is not necessarily a narrow tape such as tear-tape. It may be so wide that its cut lengths are regarded as sheets.

Although a capstan has been described as the means for drawing the tape from the supply roll, and determining its feed speed and therefore its length, a pair of feed rolls having the same peripheral speed could be used instead. The roll engaging the sticky side of the tape would be release-coated.

Instead of using suction, the applicator wheel could have a shallow groove, minutely narrower than the tape, into which the tape would be drawn by its tension. At the vicinity of the leading end of the tape at the time it is applied to the web, the sides of the groove would be omitted or of reduced height, or the base of the groove slightly bulged to be flush with the face diameter to press the tape against the web. Even when suction is used, this shallow grooving, or some of it, may be helpful.

We claim:

1. Apparatus for applying to a moving item a tape having an adhesive face and a back, including driven applicator wheel means for peripherally seizing the tape by its back and applying its adhesive face to the item at the speed of movement of the item, and feed means for pulling the tape from a roll of tape at a slower speed, and means for severing a length of tape from the following slower-fed tape and releasing said length to control of the applicator wheel means to accept the peripheral speed of the applicator wheel means for application to the item; said applicator wheel being carried in a subframe pivotable about a drive shaft and adjustable as to the angular position about the axis of said shaft for properly positioning varied sizes of applicator wheels to a given item path; said drive shaft driving said applicator wheel.

2. Apparatus for applying to a moving item a tape having an adhesive face and a back, including driven applicator wheel means for peripherally seizing the tape by its back and applying it to the item at the speed of movement of the item, and feed means including a capstan correlated driven at a substantially slower peripheral speed than the applicator wheel means for pulling the tape from a roll of tape and feeding it to the applicator wheel means with retardation causing it while intact to backslip on the applicator wheel means; and means for severing a length of tape on the applicator wheel means from the following retarded tape, to free said length to accept the peripheral speed of the applicator wheel means for application to the item and for spacing successive lengths apart, including guide rollers for guiding the tape around the capstan a plurality of turns and then to the applicator wheel.

3. Apparatus for applying to a moving item a tape having an adhesive face and a back, including driven applicator wheel means for peripherally seizing the tape by its back and applying it to the item at the speed of movement of the web, and feed means including a capstan correlated driven at a substantially slower peripheral speed than the applicator wheel means for pulling the tape from a roll of tape and feeding it to the applicator wheel means with retardation causing it while intact to backslip on the applicator wheel means; and means for severing a length of tape on the applicator wheel means from the following retarded tape, to free said length to accept the peripheral speed of the applicator wheel means for application to the item and for spacing successive lengths apart;

and phase-adjustment driving means for the foregoing, including a drive-input member, and phase-adjustment means between the drive-input member and driven parts such that when the drive-input member is driven in registration-correlation with the item, the registration of the tape on the item can be adjusted.

4. Apparatus for applying to a moving item a tape having an adhesive face and a back including a driven applicator wheel for peripherally seizing the tape by its back and applying it to the item at the speed of movement of the item, and feed means including a capstan secured to the applicator wheel but having a smaller diameter to have a substantially slower peripheral speed than the applicator wheel for pulling the tape from a roll of tape and feeding it to the applicator wheel with retardation causing it while intact to backslip on the applicator wheel; and means for severing a length of tape on the applicator wheel from the following retarded tape, to free said length to accept the peripheral speed of the applicator wheel for application to the item and for spacing successive lengths apart.

5. Apparatus according to claim 4 including guide rollers for guiding the tape around the capstan a plurality of turns and then to the applicator wheel.

6. Apparatus for applying to a moving item a tape having an adhesive face and a back, including a driven applicator wheel for peripherally seizing the tape by its back and applying it to the item at the speed of movement of the item, and feed means including a capstan secured to the applicator wheel but having a smaller diameter to have a substantially slower peripheral speed than the applicator wheel for pulling the tape from a roll of tape and feeding it to the applicator wheel with retardation causing it while intact to backslip on the applicator wheel; and means for severing a length of tape on the applicator wheel from the following retarded tape, to free said length to accept the peripheral speed of the applicator wheel for application to the item and for spacing successive lengths apart;

said applicator wheel and said capstan being jointly carried in a subframe pivotable about a drive shaft and adjustable as to the angular position about the axis of said shaft for properly positioning varied sizes of applicator wheels to a given item path; said drive shaft driving said applicator wheel and capstan.

7. Apparatus for applying to a moving item a tape having an adhesive face and a back, including driven applicator wheel means for peripherally seizing the tape by its back and applying it to the item at the speed of movement of the item, and feed means including a capstan correlated driven at a substantially slower peripheral speed than the applicator wheel means for pulling the tape from a roll of tape and feeding it to the applicator wheel means with retardation causing it while intact to backslip on the applicator wheel means; and means for severing a length of tape on the applicator wheel means from the following retarded tape, to free said length to accept the peripheral speed of the applicator wheel means for application to the item and for spacing successive lengths apart;

said severing means including a relatively fixed shearing member and a shearing blade moving shearingly across it, the shearing movement moving through the tape inwardly across the periphery of the applicator wheel means; and actuator means for actuating the shearing blade and holding it within the periphery of the applicator wheel until it has passed the point of application of the tape to the item.

* * * * *